United States Patent
Benedetti et al.

(10) Patent No.: US 6,945,750 B2
(45) Date of Patent: Sep. 20, 2005

(54) TURBINE BLADE

(75) Inventors: Bruno Benedetti, Graenichen (CH); Said Jaamei, St. Legier (CH); David Johns, Gebenstorf (CH); Joerg Krueckels, Birmenstorf (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 10/724,091

(22) Filed: Dec. 1, 2003

(65) Prior Publication Data

US 2004/0109765 A1 Jun. 10, 2004

(30) Foreign Application Priority Data

Dec. 2, 2002 (GB) ............................................. 0228066

(51) Int. Cl.⁷ .............................. F01D 5/18; F01D 9/06
(52) U.S. Cl. ...................................... 415/115; 416/97 R
(58) Field of Search ................................ 415/115, 116; 416/95, 96 R, 96 A, 97 R

(56) References Cited

U.S. PATENT DOCUMENTS

| 4,012,167 | A | * | 3/1977 | Noble ......................... 416/95 |
| 4,040,767 | A | * | 8/1977 | Dierberger et al. .......... 415/115 |
| 4,863,348 | A | * | 9/1989 | Weinhold ..................... 415/115 |
| 5,340,278 | A | | 8/1994 | Magowan |
| 5,382,135 | A | | 1/1995 | Green |
| 6,120,249 | A | | 9/2000 | Hultgren et al. |
| 6,354,797 | B1 | * | 3/2002 | Heyward et al. ............ 415/115 |
| 6,644,920 | B2 | * | 11/2003 | Beeck et al. ............... 416/97 R |
| 2002/0076324 | A1 | | 6/2002 | Abuaf et al. |

FOREIGN PATENT DOCUMENTS

| DE | 26 43 049 | 4/1977 |
| DE | 100 59 997 | 6/2002 |
| JP | 11-247606 | 9/1999 |

* cited by examiner

*Primary Examiner*—Christopher Verdier
(74) *Attorney, Agent, or Firm*—Oblon, Spivak, McClelland, Maier & Neustadt, P.C.

(57) ABSTRACT

A turbine blade for a gas turbine has a hollow airfoil extending from a platform. There is a fillet between the airfoil and the platform, both on the pressure side and on the suction side of the airfoil. The fillet contains a cooling bore extending along part of the length of the fillet, having a first end communicating with the interior of the turbine blade for receiving a gaseous coolant and a second end communicating with the exterior of the turbine blade. The cooling may be formed by electro-discharge machining.

15 Claims, 5 Drawing Sheets

TURBINE BLADE

TECHNICAL FIELD

This invention relates to a turbine blade, both a guide blade or a moving blade for a gas turbine.

BACKGROUND OF THE INVENTION

An example of a turbine blade according to the prior art is shown in FIGS. 1 and 2 of the accompanying drawings. The turbine blade 1 has a blade body or airfoil 2 extending from an outer platform 3 to an inner platform 4. The airfoil 2 is hollow and receives a gaseous coolant (e.g. air), which is discharged from holes 6 in the trailing edge 7. The interior of the airfoil 2 also communicates with the pressure side 8 and suction side 9 of the airfoil through rows of film cooling holes 11 so that the outside of the airfoil is cooled by a film which forms on the surface. Similar rows of holes 12 are formed in the platforms 3, 4. The turbine blade 1 is made by casting and there is a smooth transition or fillet 13 between each of the pressure and suction sides 8, 9 of the airfoil 2 and each of the platforms 3, 4.

For efficient cooling of the fillets 13, groups 14 of film cooling holes are provided at several different positions at the fillet. However, these additional holes increase the amount of gaseous coolant which has to be supplied to the turbine blade 1.

SUMMARY OF THE INVENTION

It is therefore the aim of the present invention to be able to enhance the cooling of a fillet and reduce the number of holes required for the mentioned purpose.

The present invention provides a turbine blade for a gas turbine, comprising a hollow airfoil extending from a platform, there being a fillet between the airfoil and the platform on the pressure side or the suction side of the airfoil. The fillet extends on a longitudinal direction along an outer circumference of the airfoil and contains a cooling bore extending along part of the length of the fillet, the cooling bore having a first end communicating with the interior of the turbine blade for receiving a gaseous coolant, and a second end communicating with the exterior of the turbine blade.

The cooling bore may be straight or curved, preferably with a substantially constant radius of curvature and may be formed by electro-discharge machining (EDM).

BRIEF DESCRIPTION OF DRAWINGS

The invention will be described further, by way of example only, with reference to the accompanying drawings, in which.

The drawings show only the parts important for the invention. Same elements will be numbered in the same way in different drawings.

DETAILED DESCRIPTION OF THE INVENTION

Figure 1:
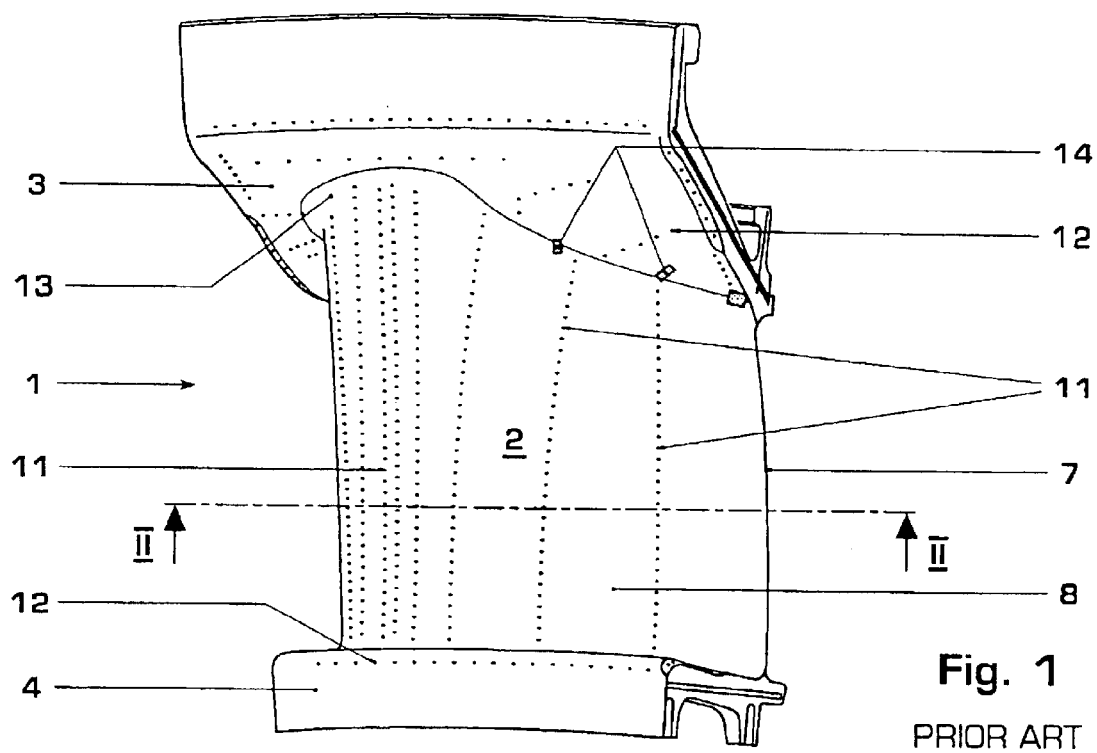
FIG. 1 is a perspective view of a known type of turbine blade according to the prior art.
Figure 2:
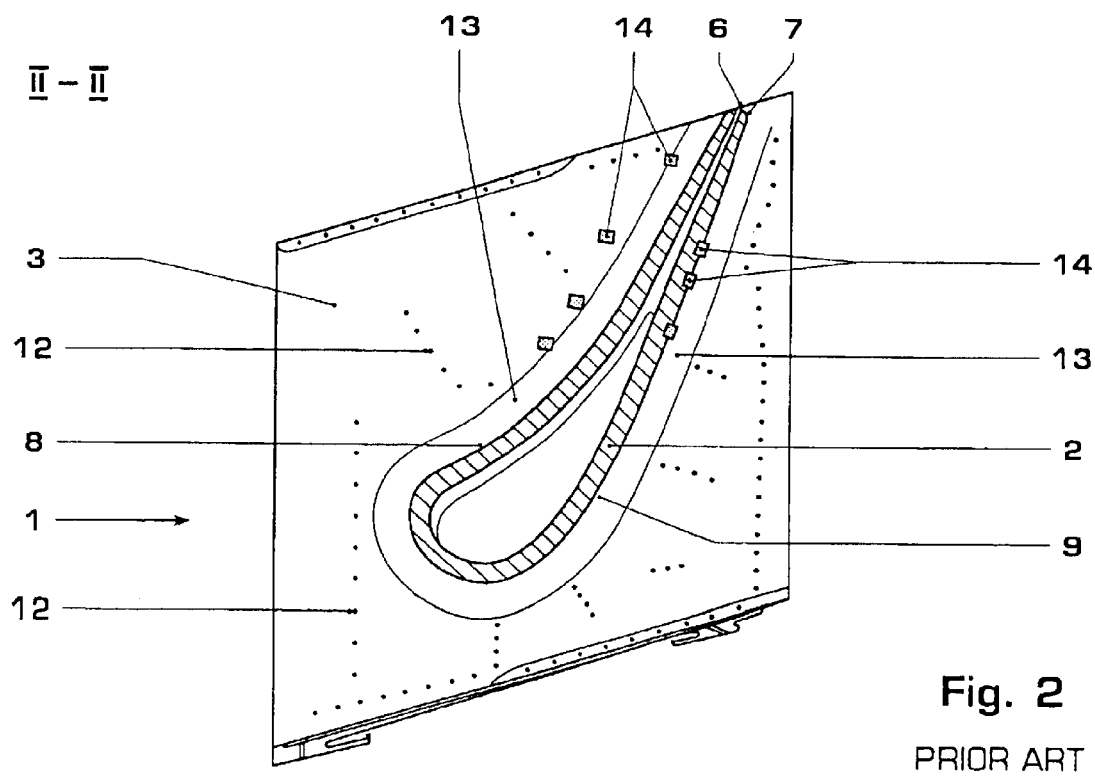
FIG. 2 is a cross-section on line II—II through the airfoil of the known turbine blade, viewing towards the outer platform.
Figure 3:
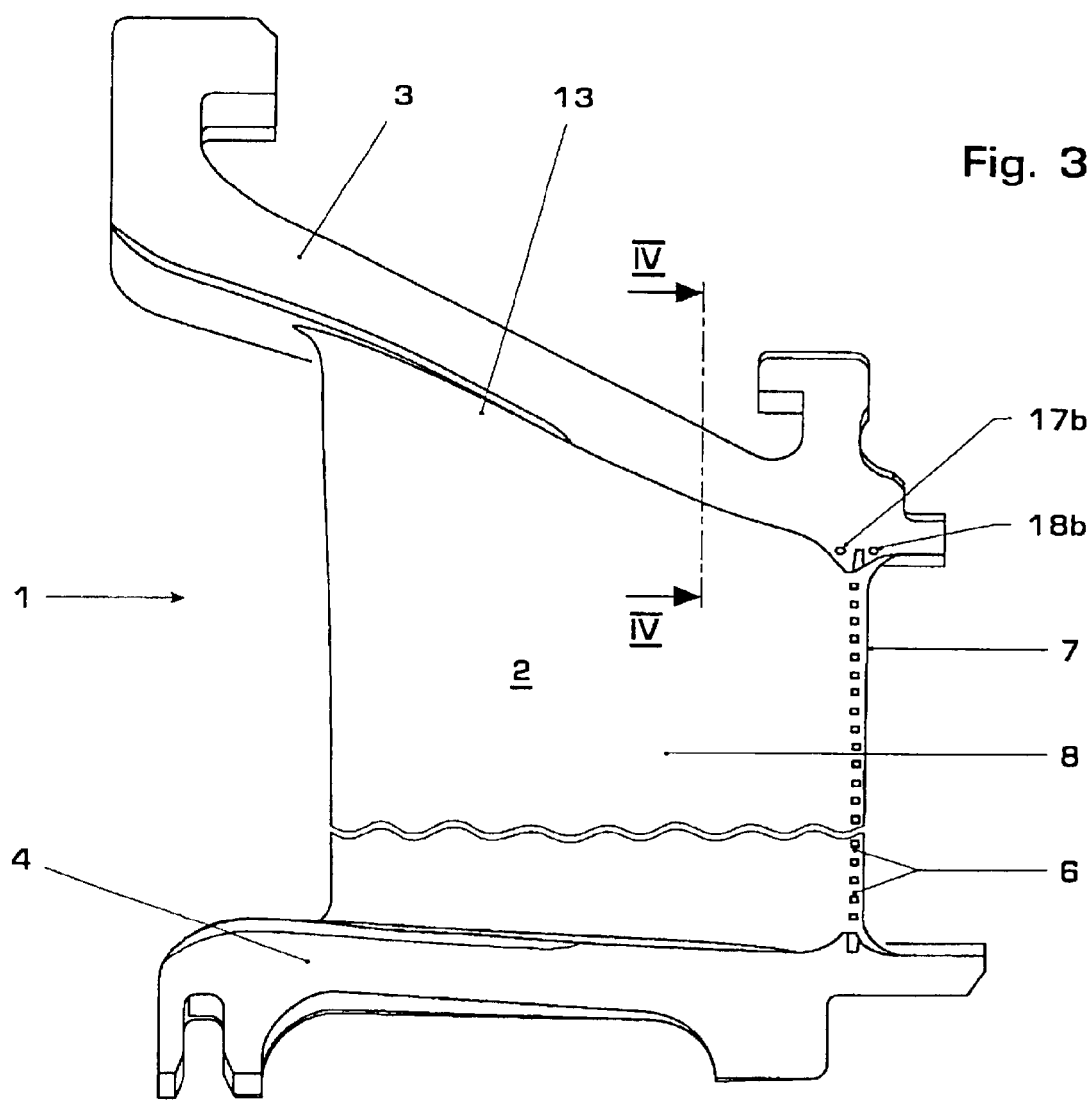
FIG. 3 shows an embodiment of a turbine blade according to the present invention, viewed from the pressure side.
Figure 4:
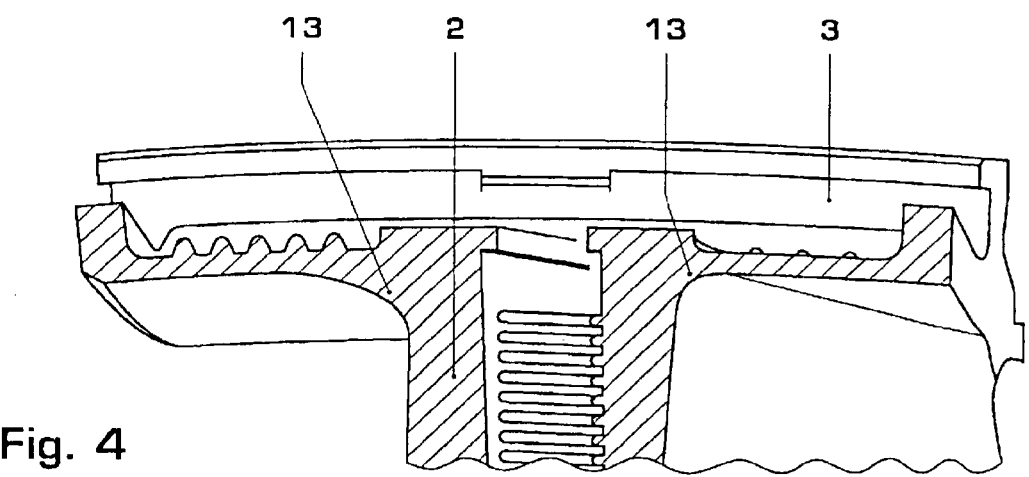
FIG. 4 is a section on line IV—IV in FIG. 3.
Figure 5:
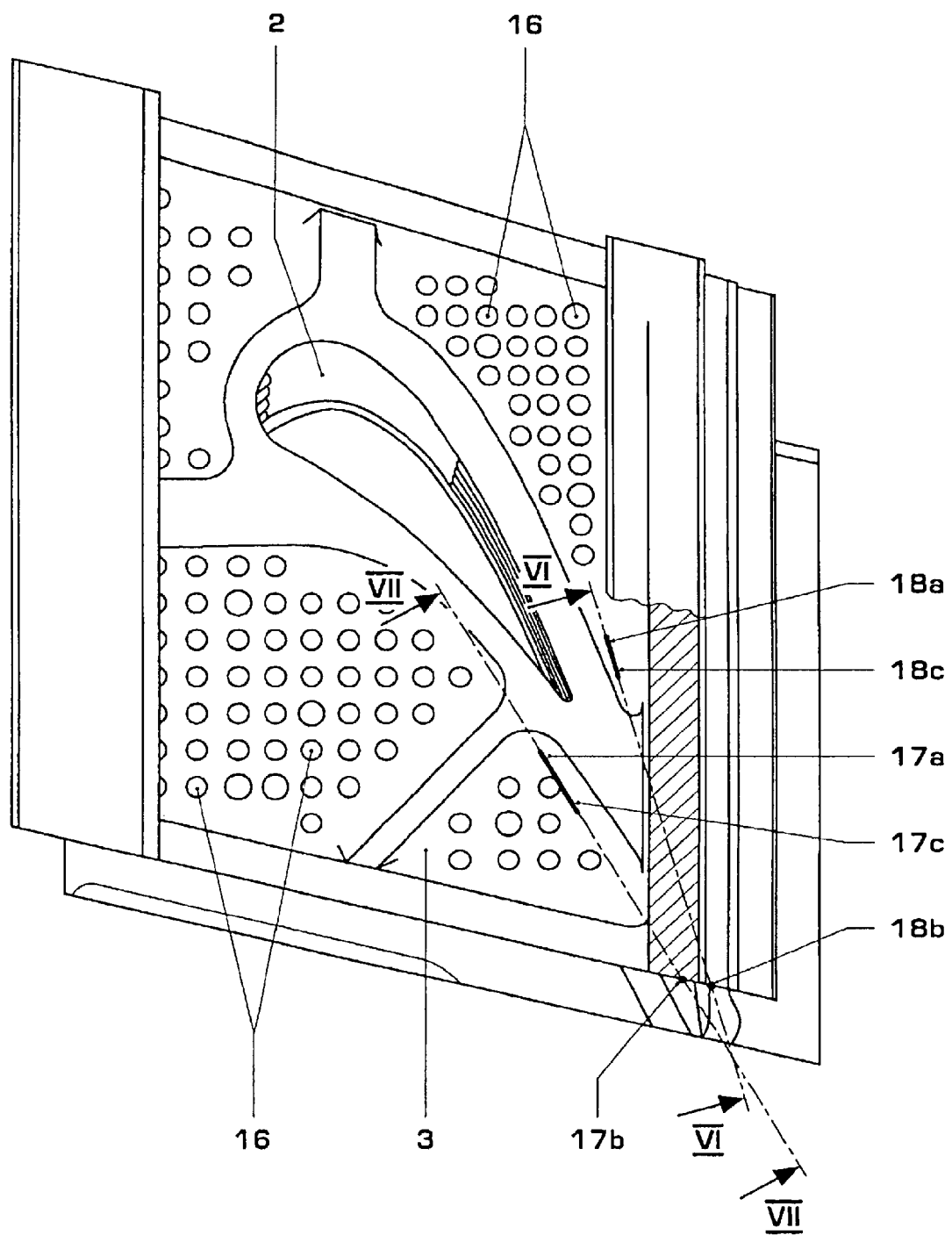
FIG. 5 shows the turbine blade of FIG. 3, viewed from the outside of the outer platform.
Figure 6:
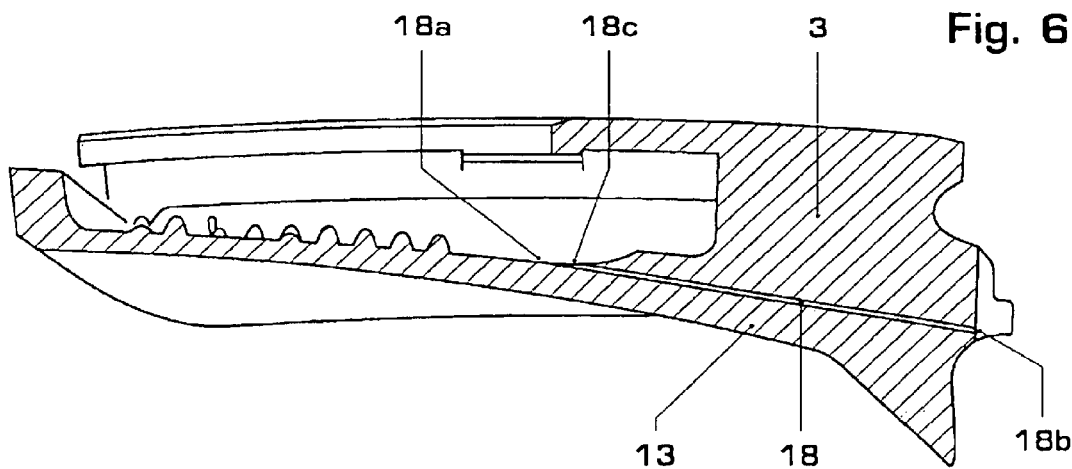
FIG. 6 is a section on line VI—VI in FIG. 5.
Figure 7:
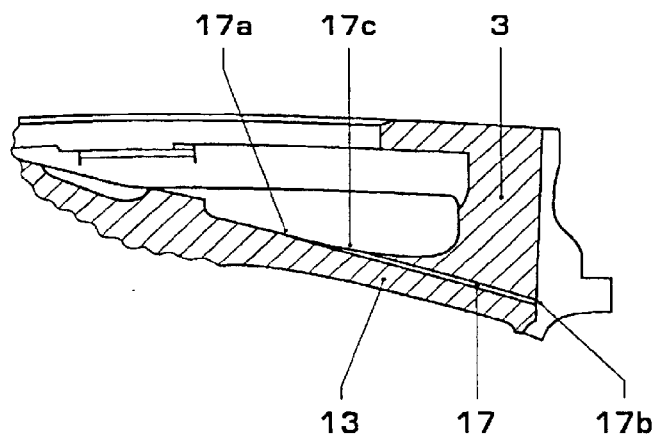
FIG. 7 is a section on line VII—VII in FIG. 5.
Figure 8:
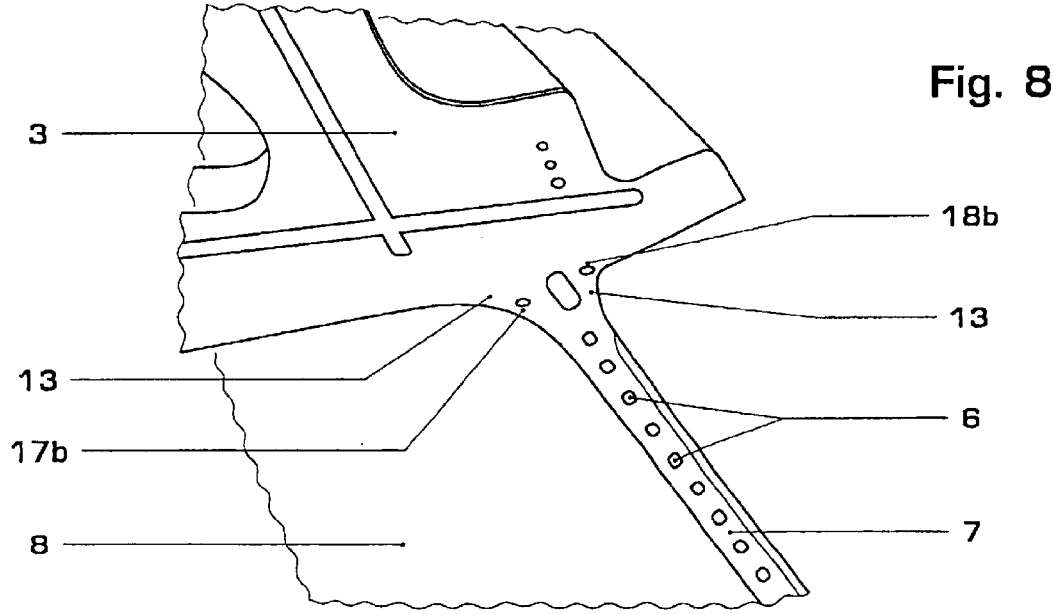
FIG. 8 is a fragmentary perspective view showing part of the exit side of the turbine blade, including part of the trailing edge of the airfoil.

The turbine blade shown in FIGS. 3 to 8 is similar in structure to the turbine blade 1 shown in FIGS. 1 and 2, and similar parts are given the same reference numerals. This turbine blade 1 could be both a guide blade or a moving blade of a gas turbine. The film cooling holes 11 and 12 in the blade body or airfoil 2 are present but are not shown in FIGS. 3 to 8, whereas the groups 14 of film cooling holes in the prior art turbine blade 1 are not present in the preferred embodiment of the turbine blade 1 according to the present invention. It will be noted that the interior of the platform 3 is provided with protuberances 16 for enhancing internal cooling (FIG. 5).

On the pressure side 8 the fillet 13 between the airfoil 2 and the outer platform 3 has a cooling bore 17 (see particular FIG. 7) which is approximately 55 mm long and which has a first end 17a communicating with the interior of the platform 3 and a second end 17b communicating with the exterior of the turbine blade 1 at the exit side, adjacent the trailing edge 7 of the airfoil 2. Similarly, on the suction side 9 the fillet 13 contains a cooling bore 18 (see particularly FIG. 6) extending for approximately 75 mm along the fillet 13 and having a first end 18a communicating with the interior of the platform 3 and a second end 18b communicating with the exterior of the turbine blade 1, adjacent the trailing edge 7. Each cooling bore 17, 18 has a diameter of 1±0.1 mm, for example.

The cooling bores 17, 18 are preferable formed in the turbine blade casting by a high speed EDM machine, using a single point rotary EDM tool. Taking account of the casting tolerances, the cooling bores 17, 18 are positioned so that their exit ends 17b, 18b are exactly at the desired position. The machining of each cooling bore 17, 18 is preferably commenced at the exit side of the turbine blade 1 and is terminated after the cooling bore 17, 18 has reached the interior of the platform 3 such that a groove 17c, 18c is formed in the platform 3.

Figure 9:
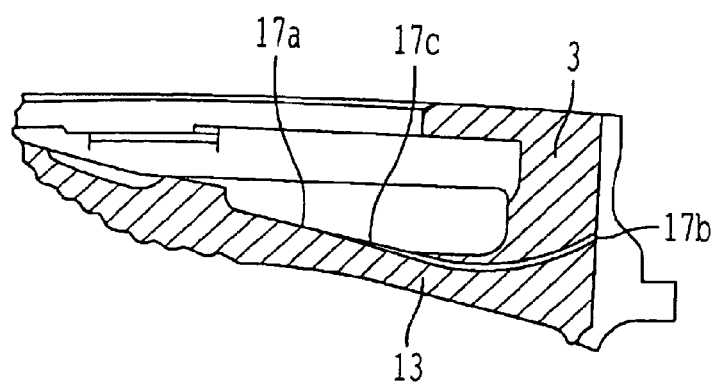
FIG. 9 is a section on line VII—VII in FIG. 5 of an alternative embodiment of the cooling bore.

Another alternative embodiment of the cooling bore 17 is shown in FIG. 9. FIG. 9 illustrates a curved cooling bore 17. Although cooling bore 17 as shown in FIG. 9 has a substantially constant radius of curvature, other curved cooling bores are possible and within the scope of the invention The cooling bores 17, 18 extending along the fillets 13 can provide approximately the same cooling effect as a multiplicity of film cooling holes, thereby saving a substantial amount of gaseous coolant.

Various modifications may be made within the scope of the invention. For example, similar cooling bores extending along the fillets 13 could be provided at other locations, in addition to or instead of the cooling bores 17, 18. Also, the provision of film cooling holes in or near the fillet 13 is not precluded. It may be possible for the cooling bore to have a diameter as small as about 0.5 mm or as large as 2 mm or more. The cooling bore will normally have a length of several centimeters, preferably at least 5 cm, the maximum length being limited by practical considerations and possibly being 10 cm or more.

Although the cooling bores 17, 18 have been described only in connection with the fillets 13 between the airfoil 2 and the outer platform 3, similar cooling bores 17, 18 could be provided on the fillets 13 between the airfoil and the inner platform 4.

While our invention has been described by an example, it is apparent that other forms could be adopted by one skilled in the art. Accordingly, the scope of our invention is to be limited only by the attached claims.

REFERENCE NUMBERS

1 Turbine blade
2 Airfoil
3 Outer platform
4 Inner platform
6 Hole
7 Trailing edge
8 Pressure side
9 Suction side
11 Film cooling hole
12 Film cooling hole
13 Transition or Fillet
14 Group of film cooling holes
16 Pertuberances
17 Cooling bore
17a First end of cooling bore 17
17b Second end of cooling bore 17
17c Groove
18 Cooling bore
18a First end of cooling bore 18
18b Second end of cooling bore 18
18c Groove

What is claimed is:

1. A turbine blade for a gas turbine, comprising a hollow airfoil extending from a platform, there being a fillet between the airfoil and the platform on a pressure side or a suction side of the airfoil, the fillet extending on a longitudinal direction along the outer circumference of the airfoil, the fillet containing a cooling bore extending along the longitudinal direction for a part of the length of the fillet, the cooling bore having a first end communicating with the interior of the turbine blade for receiving a gaseous coolant and a second end communicating with the exterior of the turbine blade.

2. The turbine blade as claimed in claim 1, wherein the first end of the cooling bore is inside the platform.

3. The turbine blade as claimed in claim 2, wherein the first end of the cooling bore in the interior of the platform is formed as a groove in the platform.

4. The turbine blade as claimed in claim 1, wherein the second end of the cooling bore is at the exit side of the turbine blade.

5. The turbine blade as claimed in claim 1, wherein the second end of the cooling bore is adjacent the trailing edge of the airfoil.

6. The turbine blade as claimed in claim 1, wherein the cooling bore is straight.

7. The turbine blade as claimed in claim 1, wherein the cooling bore is curved.

8. The turbine blade as claimed in claim 7, wherein the cooling bore has a substantially constant radius of curvature.

9. The turbine blade as claimed in claim 1, wherein the cooling bore has a diameter of approximately 1 mm.

10. The turbine blade as claimed in claim 1 wherein the cooling bore has a length of at least 5 cm.

11. The turbine blade as claimed in claim 1, further comprising two cooling bores, one in the fillet on the pressure side and the other in the fillet on the suction side.

12. The turbine blade as claimed in claim 1, wherein the cooling bore is formed by electro-discharge machining.

13. The turbine blade as claimed in claim 1, wherein the turbine blade is a guide blade or a moving blade.

14. The turbine blade as claimed in claim 1, wherein the fillet is on the pressure side.

15. The turbine blade as claimed in claim 1, wherein the fillet is on the suction side.

* * * * *